US008538813B2

(12) United States Patent
Kakarla et al.

(10) Patent No.: US 8,538,813 B2
(45) Date of Patent: Sep. 17, 2013

(54) METHOD AND SYSTEM FOR PROVIDING AN SMS-BASED INTERACTIVE ELECTRONIC MARKETING OFFER SEARCH AND DISTRIBUTION SYSTEM

(75) Inventors: Kashinath Kakarla, Bangalore (IN); Vishnu Nanda, Bangalore (IN); Anup P. Mutalik, Bangalore (IN); Sagar Dutta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 266 days.

(21) Appl. No.: 13/007,247

(22) Filed: Jan. 14, 2011

(65) Prior Publication Data

US 2012/0185333 A1 Jul. 19, 2012

(51) Int. Cl.
*G06Q 30/00* (2012.01)

(52) U.S. Cl.
USPC ............... 705/14.58; 705/14.54; 705/14.64

(58) Field of Classification Search
USPC ............................................. 705/14.58, 14.64
See application file for complete search history.

(56) References Cited

U.S. PATENT DOCUMENTS

| 7,477,909 B2 | 1/2009 | Roth |
| 7,707,218 B2 | 4/2010 | Gocht et al. |
| 2005/0228797 A1* | 10/2005 | Koningstein et al. .......... 707/100 |
| 2007/0186241 A1 | 8/2007 | Sugimoto et al. |
| 2008/0148175 A1 | 6/2008 | Naaman et al. |
| 2010/0312572 A1* | 12/2010 | Ramer et al. ................... 705/1.1 |
| 2010/0318551 A1* | 12/2010 | Lai ................................ 707/765 |
| 2011/0238409 A1 | 9/2011 | Larcheveque et al. |

OTHER PUBLICATIONS

Kakarla et al., "Method and System for Providing Detailed Information in an Interactive Manner in a Short Message Service (SMS) Environment," U.S. Appl. No. 13/014,862, filed Jan. 27, 2011.

* cited by examiner

*Primary Examiner* — John G Weiss
*Assistant Examiner* — Dipen Patel
(74) *Attorney, Agent, or Firm* — McKay and Hodgson, LLP; Philip McKay; Sean P. Lewis

(57) ABSTRACT

A method and system for providing an SMS-based interactive electronic marketing offer search and distribution system whereby a series of linked, refined, and evolving electronic marketing offer searches are performed in association with a thread of SMS text messages and automated SMS text message responses including search parameters and highlighted keywords to provide the user/consumer with a fully interactive electronic marketing offer search and distribution system using an SMS communication channel, and within the constraints of the SMS protocols.

22 Claims, 2 Drawing Sheets

METHOD AND SYSTEM FOR PROVIDING AN SMS-BASED INTERACTIVE ELECTRONIC MARKETING OFFER SEARCH AND DISTRIBUTION SYSTEM

BACKGROUND

Advertising and marketing often represents a significant on-going expense for businesses, i.e., sellers and/or providers of consumer goods, products, and/or services. Consequently, both business owners/managers and providers of marketing and advertising tools are constantly looking for new ways to provide relevant marketing offers to potential customers, i.e., consumers. In addition, consumers typically want to receive information regarding marketing offers that are of relevance to the consumer. However, consumers are also typically equally interested in not receiving information regarding irrelevant marketing offers, or, worse yet, being flooded with information regarding irrelevant marketing offers.

Traditionally, marketing offers, such as coupons, sale prices, discount offers, specific price guarantees, bundles of offers, etc. were distributed in "hard-copy", typically printed, form by various means. More recently, electronic formats for marketing offers have been adopted.

Typically, electronic marketing offers are distributed via networks of computing systems, including public networks such as the Internet and/or; via web-sites; e-mail; cable television, satellite television, and/or "on demand" television services; electronic attachments to transactional data, such as, but not limited to, transactional data from and/or displayed by, banks, credit card companies, and other financial institutions; and/or by various other, largely Internet dependent, methods and/or mechanisms for distributing an electronic marketing offer.

In addition, as the information age, and information searching/sharing capabilities, have evolved, more and more consumers, and businesses, have come to rely on Internet-based interactive electronic marketing offer search and distribution means. Internet-based interactive electronic marketing offer search and distribution means typically require Internet access, whereby a user/consumer, submits various search information and/or parameters, such as the type of product and/or service being sought, specific brands and/or model numbers desired, dimensions and/or parameters and/or features of interest, etc., through one or more Internet connected computing systems. Then, using the submitted search parameters, a search is made for electronic marketing offers in one more databases and networks, such as websites and the Internet. Typically, the user/consumer is then provided with the search results, often including multiple electronic marketing offers and/or hyperlinks; also typically via the Internet and one or more Internet connected computing systems.

In areas of the world where there Internet access, and Internet connected computing systems, are readily available, current Internet-based interactive electronic marketing offer search and distribution means have proven highly effective and are very popular with both businesses and users/consumers. However, extensive studies among consumers in emerging economies, and, in particular, India, have shown that consumers there have considerable difficulty obtaining relevant electronic marketing offers.

Currently, this problem is largely attributable to a lack of network infrastructure, and, in particular, very limited access to both the Internet and Internet connected computing systems. Of course, this is often particularly true in more rural areas. In short, for many consumers in areas of the world having emerging economies, reliable access to the Internet, and Internet connected computing systems, is not a reality. Consequently, currently, the highly effective and popular Internet-based interactive electronic marketing offer search and distribution means discussed above are largely not available to many consumers in these areas of the world.

However, in contrast to traditional Internet access, and Internet connected computing systems, mobile phones, and mobile communication technologies, are widely available, readily accessible, and generally affordable in most areas with emerging economies. Consequently, in many areas with emerging economies, mobile phones, and mobile communication technology, is currently available to, and used by, a much larger set of consumers than traditional Internet connected computing systems, or the Internet. Consequently, currently, mobile phones, and mobile communication technology, have the potential, at least in theory, to provide consumers at least some access to electronic marketing offers. However, this potential is currently largely thwarted by the fact that mobile phone technology relies on Short Message Service (SMS) protocols and architectures.

SMS is the text communication service component of phone, web, or mobile communication systems. SMS uses relatively ridged standardized communications protocols that allow the exchange of only very short text messages between fixed line or mobile phone devices. Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as currently implemented, does not readily, easily, or efficiently, lend itself to being used as an interactive electronic marketing offer search and distribution means. Consequently, currently, electronic marketing offers sent via SMS are typically limited to one-way blast SMS messages that are often not desired by the receiver and are not interactive, or in any real way, customized/tailored to the consumer/user receiving the message. As a result, current blast SMS message based electronic marketing offers are often considered an annoyance, to be largely ignored, by the receiving consumer/user.

In light of the situation described above, even though, in terms of access and availability, SMS is the best communication channel for many parts of the world, the severe limitations of SMS communication channels and the SMS protocols, has historically prevented SMS channels from being used as an interactive electronic marketing offer search and distribution means. As a result, currently, many consumers in areas of the world having emerging economies are denied the full benefits of the information age and the benefits of interactive electronic marketing offer search and/or distribution.

SUMMARY

In accordance with one embodiment, a method and system for providing an SMS-based interactive electronic marketing offer search and distribution system includes a process for providing an SMS-based interactive electronic marketing offer search and distribution system whereby, in one embodiment, electronic marketing offer data representing one or more electronic marketing offers is obtained from one or more sources. In one embodiment, key features, and/or potential "keywords", associated with the electronic marketing offer data and/or one or more electronic marketing offers are identified and associated with the respective electronic marketing offer data and/or one or more electronic marketing offers. In one embodiment, a user/consumer sends initial search parameter data in the form of SMS text in an "original SMS text message". In one embodiment, the "original SMS text message" includes an initial search parameter that indicates an item of interest, i.e., a product and/or service of interest, and for which the user/consumer would like to find electronic marketing offers. In one embodiment, the "original SMS text message" also includes one or more other initial search parameters associated with the item of interest, and/or the user/consumer, such as a location of the user/consumer. In one embodiment, the initial search parameter data from the "original SMS text message" is used to search the electronic marketing offer data representing one or more electronic marketing offers. In one embodiment, a "SMS search response text message" is automatically generated and sent back to the user/consumer that includes SMS text representing a defined number of the "top" "matched electronic marketing offers", i.e., electronic marketing offers matching, or most closely matching, the initial search parameters. In one embodiment, one or more keywords in the SMS text in the "SMS search response text message" representing the "matched electronic marketing offers" are bracketed, or otherwise highlighted, to indicate that more electronic marketing offers and/or information is available regarding the keywords. In one embodiment, if the user/consumer desires more information regarding the keywords, the user/consumer need only send a "follow-up SMS text message" back that includes the keyword, or an indicated phrase including the keyword. In one embodiment, the keywords are flexible and inferred within the context of "original SMS text message" and the initial search parameters. In one embodiment, if the user/consumer sends a "follow-up SMS text message" that includes the keyword, or an indicated phrase including the keyword, the data representing one or more electronic marketing offers is again searched for "keyword matched electronic marketing offers" not only matching the keyword but also matching, or consistent with the context of, the initial search parameters of the "original SMS text message" from the user/consumer, and/or the "matched electronic marketing offers". Consequently, using the "follow-up SMS text message", or subsequently "follow-up SMS messages", the user/consumer can select the highlighted keyword, and/or keyword phrase response, to define, and automatically request, a further refined search and, in one embodiment, these further refined searches are made using the added search parameters, in the form of the identified keywords, as interpreted within the context of all the initial parameters, and all keywords identified thus far. Consequently, in one embodiment, a series, or tree, of linked, refined, and evolving electronic marketing offer searches are performed in association with a thread of SMS text messages to provide the user/consumer with a fully interactive electronic marketing offer search and distribution system using an SMS communication channel, and within the constraints of the SMS protocols.

Using the method and system for providing an SMS-based interactive electronic marketing offer search and distribution system, as discussed herein, the keywords are flexibly and dynamically defined, inferred, selected, and interpreted, by the content, and within the context, of the set of SMS text messages sent and the electronic marketing offers themselves. Consequently, the SMS-based interactive electronic marketing offer search and distribution systems provided using the method and system for providing an SMS-based interactive electronic marketing offer search and distribution system, as discussed herein, are user friendly and their use/operation is intuitive for the user/consumer.

In addition, as discussed above, using the method and system for providing an SMS-based interactive electronic marketing offer search and distribution system, a thread of electronic marketing offer searches associated with a thread of SMS text messages is created to provide the user/consumer with a fully interactive electronic marketing offer search and distribution system using an SMS communication channel, and within the constraints of the SMS protocols. Consequently, the severe limitations of SMS communication channels that had historically prevented SMS channels from being used as an interactive electronic marketing offer search and distribution means are overcome. Therefore, using the method and system for providing an SMS-based interactive electronic marketing offer search and distribution system, as discussed herein, many users/consumer in areas of the world having emerging economies can be provided more of the benefits of the information age and the benefits of interactive electronic marketing offer searches and distribution.

Figure 1:
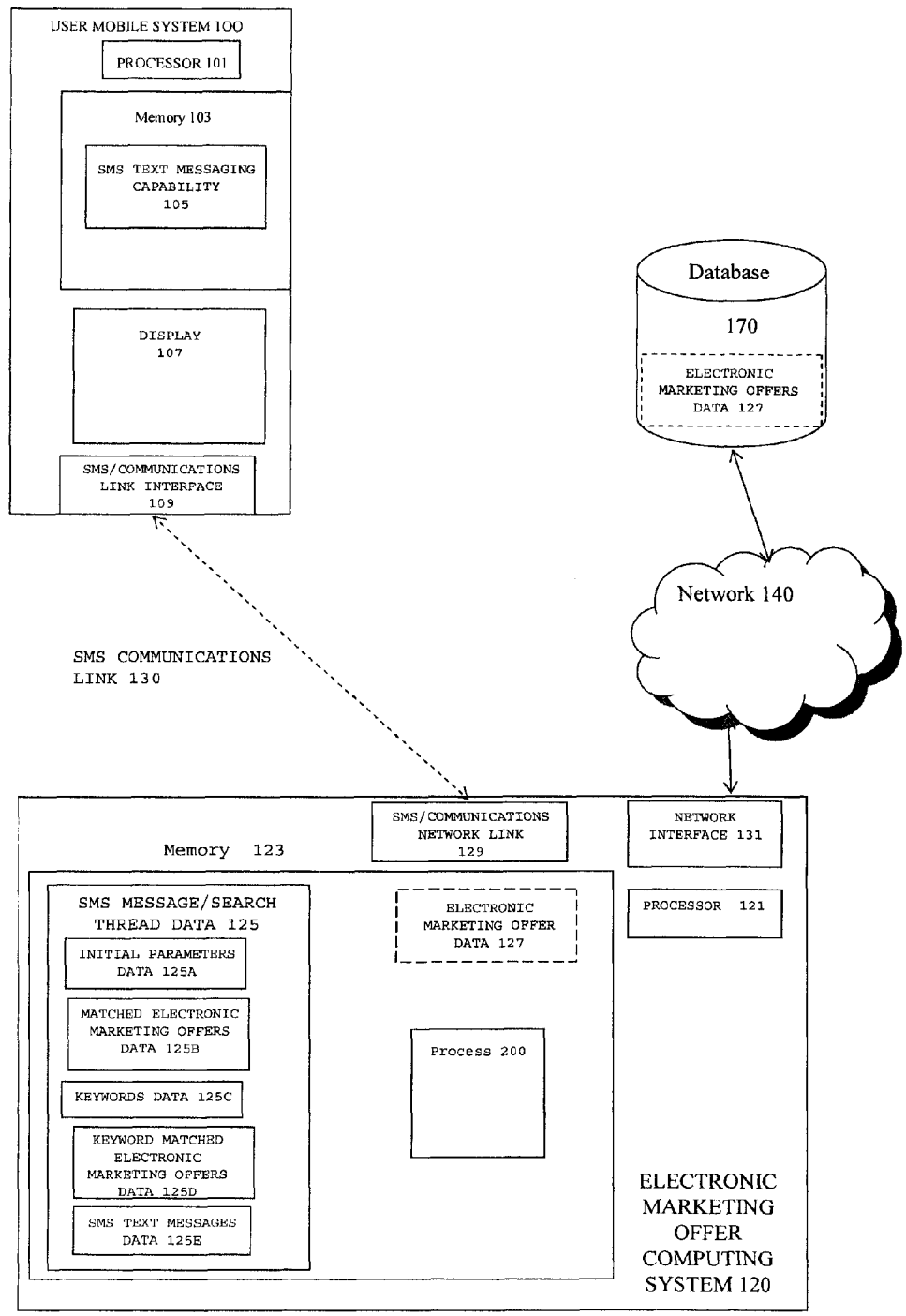
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIG.s, and/or described below.

In accordance with one embodiment, a method and system for providing an SMS-based interactive electronic marketing offer search and distribution system includes a process for providing an SMS-based interactive electronic marketing offer search and distribution system whereby electronic marketing offer data representing one or more electronic marketing offers is obtained from one or more sources.

In one embodiment, the electronic marketing offer data is obtained by an electronic marketing offer computing system, such as a backend server system. In one embodiment, the electronic marketing offer data is obtained by the electronic marketing offer computing system from one or businesses, providers of one or more products, and/or providers of one or more services via a network, such as the Internet or in the form of a computer program product. In one embodiment, the electronic marketing offer data is obtained by the electronic marketing offer computing system in the form of Extensible Markup Language (XML) via a network, such as the Internet.

In one embodiment, one or more processors associated with the electronic marketing offer computing system identify parameters or "key features" associated with the electronic marketing offer data and/or one or more electronic marketing offers. In various embodiments, the key features can include, but are not limited to, any one or more of the following: the type of item, i.e., the general and/or specific product or service associated with the electronic marketing offer, such as a Television (TV); a brand name or model name/number associated with the item, i.e., the brand name, model name, model line name, and/or model number of the specific product or service associated with the electronic marketing offer, such as Sony™ or Sony Brava™ or Sony Brava™ EX 400; dimensions and/or features associated with the item, i.e., the dimensions and/or features of the specific product or service associated with the electronic marketing offer, such as 32" LCD TV; a specific store or chain of stores associated with the item and/or the electronic marketing offer, such as "E-Zone" or "BestBuy"; a location associated with the item and/or the electronic marketing offer, such a "Jayanagar, India", or "Sunnyvale, Calif."; landmarks near the location associated with the item and/or the electronic marketing offer, such as "Opposite Chandra Sagar Choultry"; a retail or Manufacturer's Suggested Retail Price (MSRP) for the item, and/or the normal price of the item associated with the electronic marketing offer, absent the electronic marketing offer; the terms of the electronic marketing offer, such as the price of the item offered through the electronic marketing offer or special incentives provided through the electronic marketing offer such as free shipping, bundling etc.; restrictions associated with the electronic marketing offer such as expiration dates, bundling, minimum purchases, etc.; and/or any other key features identified by the electronic marketing offer computing system and/or as desired by the provider of the SMS-based interactive electronic marketing offer search and distribution system, and/or the provider of the electronic marketing offer.

In one embodiment, all, or some, of the key features identified by the one or more processors associated with the electronic marketing offer computing system in the electronic marketing offer data and/or one or more electronic marketing offers are also analyzed for potential use as "keywords" to be associated with an electronic marketing offer search as discussed below.

In one embodiment, the key features identified by the one or more processors associated with the electronic marketing offer computing system in the electronic marketing offer data and/or one or more electronic marketing offers are associated with the respective electronic marketing offer data and/or the respective electronic marketing offer and used to categorize, correlate, and store the electronic marketing offer data and/or one or more electronic marketing offers.

Below is a specific illustrative example of three electronic marketing offers as received, and processed, by an electronic marketing offer computing system, e.g., a backend server, in one embodiment. In this specific illustrative example the first offer is provided in XML and is for a Sony LCD TV having a 32 inch screen, a 32,000 rupee MSRP, an offer price of 28,000 rupees, and is being offered through/by the store "E-zone" located at Jayanagar 2nd Block opposite Chandra Sagar Choultry.

In this specific illustrative example, the identified key features of this specific offer, offer number 1, are: Brand=Sony; Feature=LCD; Size=32; Cost=32K; Sore=E-Zone; Location=Jayanagar 2nd Block; Landmark=Opposite Chandra Sagar Choultry; and Offer=28K. Consequently, in this specific illustrative example, this specific offer, offer number 1, is processed and/or stored by the electronic marketing offer computing system as:

```
<offerData>
  <offer id="1">
    <param name="brand"      value = "sony">
    <param name="feature"    value = "lcd">
    <param name="size"       value = "32">
    <param name="cost"       value = "32K">
  <text> Sony LCD 32" MRP Rs. 32,000 Offer Rs 28,000 </text>
  <store> E-zone </store>
  <location> Jayanagar 2nd Block </location>
  <landmark> Opposite Chandra Sagar Choultry </landmark>
```

In this specific illustrative example, the second offer is provided in XML and is for a LG LCD TV having a 28 inch screen, a 26,000 rupee MSRP, an offer price of 25,500 rupees, and is being offered through/by the store/provider "Griha Vaibhav" located at Jayanagar 5th Block near the JP Nagar Entrance.

In this specific illustrative example, the identified key features of this specific offer, offer number 2, are: Brand=LG; Feature=LCD; Size=28; Cost=26K; Sore=Griha Vaibhav; Location=Jayanagar 5th Block; Landmark=Near JP Nagar Entrance; and Offer=25.5K. Consequently, in this specific illustrative example, this specific offer, offer number 2, is processed and stored by the electronic marketing offer computing system as:

```
  </offer>
  <offer id="2">
    <param name="brand"      value = "LG">
    <param name="feature"    value = "lcd">
    <param name="size"       value = "28">
    <param name="cost"       value = "26K">
  <text> LG LCD 28" MRP 26,000 Offer 25,500
  </text>
  <store> Griha Vaibhav </store>
  <location> Jayanagar 5th Block </location>
  <landmark> Near JP Nagar Entrance </landmark>
```

In this specific illustrative example, the third offer is provided in XML and is for a Sony HDTV having a 50 inch screen, a 30,000 rupee MSRP, an offer price of 27,000 rupees, and is being offered through/by the store/provider "Manjunatha" located at Jayanagar 4th Block.

In this specific illustrative example, the identified key features of this specific offer, offer number 3, are: Brand=Sony; Feature=HDTV; Size=50; Cost=30K; Sore=Manjunatha; Location=Jayanagar 4th Block; Landmark=none; and Offer=27K. Consequently, in this specific illustrative example, this specific offer, offer number 3, is processed and stored by the electronic marketing offer computing system as:

```
<offerData>
  <offer id="3">
    <param name="brand"      value = "sony">
    <param name="feature"    value = "HDTV">
    <param name="size"       value = "50">
```

-continued

```
<param name="cost"        value = "30K">
<text> Sony HDTV 50" MRP Rs. 30,000 Offer Rs
27,000 </text>
<store> Manjunatha </store>
<location> Jayanagar 4th Block </location>
<landmark> none </landmark>
```

In one embodiment, given the XML representation of the three specific illustrative electronic marketing offers, offer number 1, offer number 2, and offer number 3, shown above, the electronic marketing offer computing system, e.g., the backend server, automatically generates links between the three electronic marketing offers and the electronic marketing offers can be looked up along any of the key features identified in the XMLs above.

As can also be seen in the specific illustrative example above, in one embodiment, even if the electronic marketing offer data is in free text form, the electronic marketing offer computing system, e.g., the backend server, can extract the relevant entities, i.e., the key features/keywords from the text to structure the data in the above XML format for the SMS-based interactive electronic marketing offer search and distribution system to use.

In one embodiment, a user/consumer sends initial search parameter data in the form of SMS text in an "original SMS text message" to the SMS-based interactive electronic marketing offer search and distribution system.

As noted above, Short Message Service (SMS) is the text communication service component of phone, web, or mobile communication systems. As also noted above, SMS uses relatively ridged standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive electronic marketing offer search and distribution means. Consequently, the prevailing historical view was that an SMS-based interactive electronic marketing offer search and distribution system was impractical, if not impossible. Consequently, historically, electronic marketing offers sent via SMS were typically limited to one-way blast SMS messages that were static and were often considered an annoyance, to be largely ignored, by the receiving consumer/user.

In one embodiment, the original SMS text message sent by the user/consumer to the SMS-based interactive electronic marketing offer search and distribution system includes an initial search parameter that indicates an item of interest, i.e., a product and/or service of interest, and for which the user/consumer would like to find electronic marketing offers.

In one embodiment, the original SMS text message sent by the user/consumer to the SMS-based interactive electronic marketing offer search and distribution system also includes one or more other initial search parameters associated with the item of interest, and/or the user/consumer. In various embodiments, the one or more other initial search parameters associated with the item of interest, and/or the user/consumer include, but are not limited to, one or more of: the user's/consumer's location, or a desired location; any key dimensions, sizes, features, associated with the item of interest; a brand name or model associated with the item of interest; or any other desired search parameter associated with the item of interest that can be set forth in an SMS text format, and under SMS text message constraints, in a single SMS text message.

Continuing with the one specific illustrative example discussed above, an illustrative example of an original SMS text message sent to the SMS-based interactive electronic marketing offer search and distribution system by a given user/consumer looking for a TV in Jayanagar, India, could be as simple as "Find TV Jayanagar". In this specific example, the initial search parameter data includes "TV" and "Jayanagar".

In one embodiment, the initial search parameter data from original SMS text message is used to search the electronic marketing offer data representing one or more electronic marketing offers by one or more processors associated with one or more computing systems, such as one or more processors associated with the electronic marketing offer computing system.

In one embodiment, as a result of the search of the electronic marketing offer data representing one or more electronic marketing offers by one or more processors associated with one or more computing systems, one or more "matched electronic marketing offers" that match, or most closely match, the initial search parameter data are identified.

In one embodiment, a defined number of the "top" or most closely matched "matched electronic marketing offers" are selected. In one embodiment, the defined number of the most closely matched "matched electronic marketing offers" is chosen based on the limitations imposed by the SMS protocol. As an example, in one embodiment the two most closely matched "matched electronic marketing offers" are selected. In another example, in one embodiment, the three most closely matched "matched electronic marketing offers" are selected.

In one embodiment, the selected "matched electronic marketing offers" are specially formatted with keywords highlighted and sent to user/consumer in a "SMS search response text message" via SMS. In one embodiment, the selected "matched electronic marketing offers" are specially formatted with keywords highlighted and automatically sent to user/consumer in a "SMS search response text message" via SMS by one or more processors associated with the electronic marketing offer computing system.

As noted above, in one embodiment, one or more "keywords" in the selected "matched electronic marketing offers" of the "SMS search response text message" are bracketed, or otherwise highlighted. In one embodiment, the bracketing, or other highlighting, is used to indicate to the user/consumer that more electronic marketing offers and/or information is available regarding the keywords.

In one embodiment, if the user/consumer desires more electronic marketing offers and/or information associated with a bracketed, or otherwise highlighted, keyword, the user/consumer need only send back a "follow-up SMS text message" that includes the bracketed, or otherwise highlighted, keyword, or an indicated phrase including the keyword.

Continuing with the one specific illustrative example discussed above, recall that the illustrative example of an original SMS text message sent to the SMS-based interactive electronic marketing offer search and distribution system by a given user/consumer looking for a TV in Jayanagar, India, read "Find TV Jayanagar" and, therefore, the initial search parameter data included "TV" and "Jayanagar".

In this specific illustrative example, the three specific illustrative offers, i.e., offer number 1, offer number 2, and offer number 3, would match the initial search parameter data of "TV" and "Jayanagar". Recall that, in this specific example, offer number 1, was processed and/or stored by the electronic marketing offer computing system as:

```
<offerData>
<offer id="1">
    <param name="brand"     value = "sony">
    <param name="feature"   value = "lcd">
    <param name="size"      value = "32">
    <param name="cost"      value = "32K">
<text> Sony LCD 32" MRP Rs. 32,000 Offer Rs
28,000 </text>
<store> E-zone </store>
<location> Jayanagar 2nd Block </location>
<landmark> Opposite Chandra Sagar Choultry
</landmark>
```

Further recall that, in this specific example, offer number 2, was processed and/or stored by the electronic marketing offer computing system as:

```
</offer>
<offer id="2">
    <param name="brand"     value = "LG">
    <param name="feature"   value = "lcd">
    <param name="size"      value = "28">
    <param name="cost"      value = "26K">
<text> LG LCD 28" MRP 26,000 Offer 25,500
</text>
<store> Griha Vaibhav </store>
<location> Jayanagar 5th Block </location>
<landmark> Near JP Nagar Entrance </landmark>
```

Further recall that, in this specific example, offer number 3, was processed and/or stored by the electronic marketing offer computing system as:

```
<offerData>
<offer id="3">
    <param name="brand"     value = "sony">
    <param name="feature"   value = "HDTV">
    <param name="size"      value = "50">
    <param name="cost"      value = "30K">
<text> Sony HDTV 50" MRP Rs. 30,000 Offer Rs
27,000 </text>
<store> Manjunatha </store>
<location> Jayanagar 4th Block </location>
<landmark> none </landmark>
```

In this specific illustrative example, it is further stipulated that only offer number 1 and offer number 2 are initially selected as "matched electronic marketing offers". Consequently, an illustrative example of an "SMS search response text message" sent via SMS by one or more processors associated with the electronic marketing offer computing system would include the following text:

```
"[Sony] LCD 32" MRP 32,000 Offer 28,000 @@ E-
zone Jayanagar 2nd Block"
"LG [LCD] 28" MRP 26,000 Offer 25,500 @@ Griha
Vaibhav Jayanagar 5th Block"
```

As seen above, both the words "Sony" and "LCD" are keywords and are therefore bracketed as "[Sony]" and "[LCD]" indicating that more electronic marketing offers and/or information are available for both the keywords "Sony" and "LCD".

In one embodiment, the keywords are flexibly selected and defined, and are inferred from the context of original SMS text message and the initial search parameters.

In one embodiment, the user/consumer sends a "follow-up SMS text message" that includes the keyword, or an indicated phrase including the keyword.

Continuing with the one specific illustrative example discussed above, recall that, in this specific example, the "SMS search response text message" sent via SMS by one or more processors associated with the electronic marketing offer computing system included the keywords "[Sony]" and "[LCD]". Consequently, in this specific example, the "follow-up SMS text message" could include the follow-up phrase "more sony" indicating the user/consumer desires more electronic marketing offers and/or information associated with the brand "Sony".

In one embodiment, the data representing one or more electronic marketing offers is searched for offers not only matching the keyword designated in the "follow-up SMS text message" from the user/consumer, but also matching, or consistent with the context of, the initial search parameters of the original SMS text message from the user/consumer.

In one embodiment, as a result of the search of the electronic marketing offer data representing one or more electronic marketing offers using the keyword designated in the "follow-up SMS text message", one or more "keyword matched electronic marketing offers" that include the designated keyword and match, or most closely match, the initial search parameter data are identified.

In one embodiment, a defined number of the "top" or most closely matched "keyword matched electronic marketing offers" are selected. In one embodiment, the defined number of the most closely matched "keyword matched electronic marketing offers" is chosen based on the limitations imposed by the SMS protocol. As an example, in one embodiment, the two most closely matched "keyword matched electronic marketing offers" are selected. In another example, in one embodiment, the three most closely matched "keyword matched electronic marketing offers" are selected.

In one embodiment, the selected "keyword matched electronic marketing offers" are again specially formatted with keywords highlighted and sent to user/consumer in a "SMS keyword search response text message" via SMS. In one embodiment, the selected "keyword matched electronic marketing offers" are specially formatted with keywords highlighted and automatically sent to user/consumer in a "SMS keyword search response text message" via SMS by one or more processors associated with the electronic marketing offer computing system.

In various embodiments, the exchange of "follow-up SMS text messages" including designated keywords, or keyword response phrases, and "SMS keyword search response text messages" including "keyword matched electronic marketing offers" and additional highlighted keywords, can be repeated as many times as the user/consumer desires until the desired level of electronic offer specificity is attained. Consequently, in the "follow-up SMS text message", or subsequent "follow-up SMS text messages", the user/consumer can use the highlighted keywords to define, and automatically request, further refined searches and, in one embodiment, these further refined searches are performed while interpreting the added search parameters, in the form of the identified keywords, within the context of all the initial parameters, and all keywords, identified thus far.

As noted above, in various embodiments, the keywords are flexible, dynamic, and inferred and selected based, at least in part, on the content, and within the context, of the set of SMS text messages sent and the electronic marketing offers themselves. Consequently, in one embodiment, a thread, or tree, of related electronic marketing offer searches associated with a thread of SMS text messages is created to provide the user/consumer with a fully interactive electronic marketing offer search and distribution system using an SMS communication channel, and within the constraints of the SMS protocols.

Continuing with the one specific illustrative example discussed above, recall that offer number 3 was not selected as a one of the "matched electronic marketing offers" in the "SMS search response text message". Further recall that offer number 3 was processed and stored by the electronic marketing offer computing system as:

```
<offerData>
<offer id="3">
    <param name="brand"       value = "sony">
    <param name="feature"     value = "HDTV">
    <param name="size"        value = "50">
    <param name="cost"        value = "30K">
<text> Sony HDTV 50" MRP Rs. 30,000 Offer Rs 27,000 </text>
<store> Manjunatha </store>
<location> Jayanagar 4th Block </location>
<landmark> none </landmark>
```

Further recall that the user/consumer's "follow-up SMS text message" included the follow-up phrase "more sony" indicating the user/consumer desired more electronic marketing offers and/or information associated with the brand "Sony". Consequently, in this specific illustrative example, the "SMS keyword search response text message" would include the following text indicating the "keyword matched electronic marketing offers" of offer number 1 and offer number 3, with offer number 2, to an LG TV, having been dropped:

```
"[Sony] LCD 32" MRP 32,000 Offer 28,000 @@ E-zone Jayanagar 2nd Block"
"[Sony] [HDTV] 50" MRP 30,000 Offer 27,000 @@ Manjunatha Jayanagar 4th Block "
```

As seen above, both the words "Sony" and now "HDTV" are keywords and are therefore bracketed as "[Sony]" and "[HDTV]" indicating that more electronic marketing offers and/or information are available for both the keywords "Sony" and "HDTV".

In one embodiment, should the user/consumer desire to begin a new search, i.e., to reset the entire search and interaction process, the user/consumer need only resend the original SMS text message with initial search parameters.

Using the process for providing an SMS-based interactive electronic marketing offer search and distribution system, as discussed herein, the keywords are flexibly and dynamically defined, inferred, selected, and interpreted, by the content, and within the context, of the set of SMS text messages sent and the electronic marketing offers themselves. Consequently, the SMS-based interactive electronic marketing offer search and distribution systems provided using the process for providing an SMS-based interactive electronic marketing offer search and distribution system, as discussed herein, are user friendly and their use/operation is intuitive for the user/consumer.

In addition, as discussed above, using the process for providing an SMS-based interactive electronic marketing offer search and distribution system, a thread of electronic marketing offer searches associated with a thread of SMS text messages is created to provide the user/consumer with a fully interactive electronic marketing offer search and distribution system using an SMS communication channel, and within the constraints of the SMS protocols. Consequently, the severe limitations of SMS communication channels that had historically prevented SMS channels from being used as an interactive electronic marketing offer search and distribution means are overcome. Therefore, using the process for providing an SMS-based interactive electronic marketing offer search and distribution system, as discussed herein, many users/consumer in areas of the world having emerging economies can be provided more of the benefits of the information age and the benefits of interactive electronic marketing offer searches and distribution.

Hardware Architecture

FIG. 1 is a block diagram of an exemplary hardware architecture for implementing one embodiment of a system and method for providing an SMS-based interactive electronic marketing offer search and distribution system, such as exemplary process 200 discussed herein, that includes: a user mobile system 100, e.g., a user mobile phone or smart phone; an electronic marketing offer computing system 120, e.g., a backend server; an SMS communications link 130, and a database 170, coupled to electronic marketing offer computing system 120 via a network 140, such as the Internet.

As seen in FIG. 1, user mobile system 100 typically includes a processor 101, a memory system 103, a display 107, and an SMS/communications link interface 109.

In one embodiment, memory system 103 includes all, or part of, an SMS text messaging capability 105 that includes instructions and/or data for allowing a user of user mobile system 100 to send text messages via SMS/communications link interface 109 and SMS communications link 130.

In one embodiment, SMS/communications link interface 109 and SMS communications link 130 provides mobile system 100 the ability to send SMS text messages to, and receive SMS text messages from, electronic marketing offer computing system 120.

In various embodiments, user mobile system 100 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user mobile system 100 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Also seen in FIG. 1 is electronic marketing offer computing system 120 that typically includes a processor 121, an SMS/communications link 129; a network interface 131, and a memory system 123.

Figure 2:
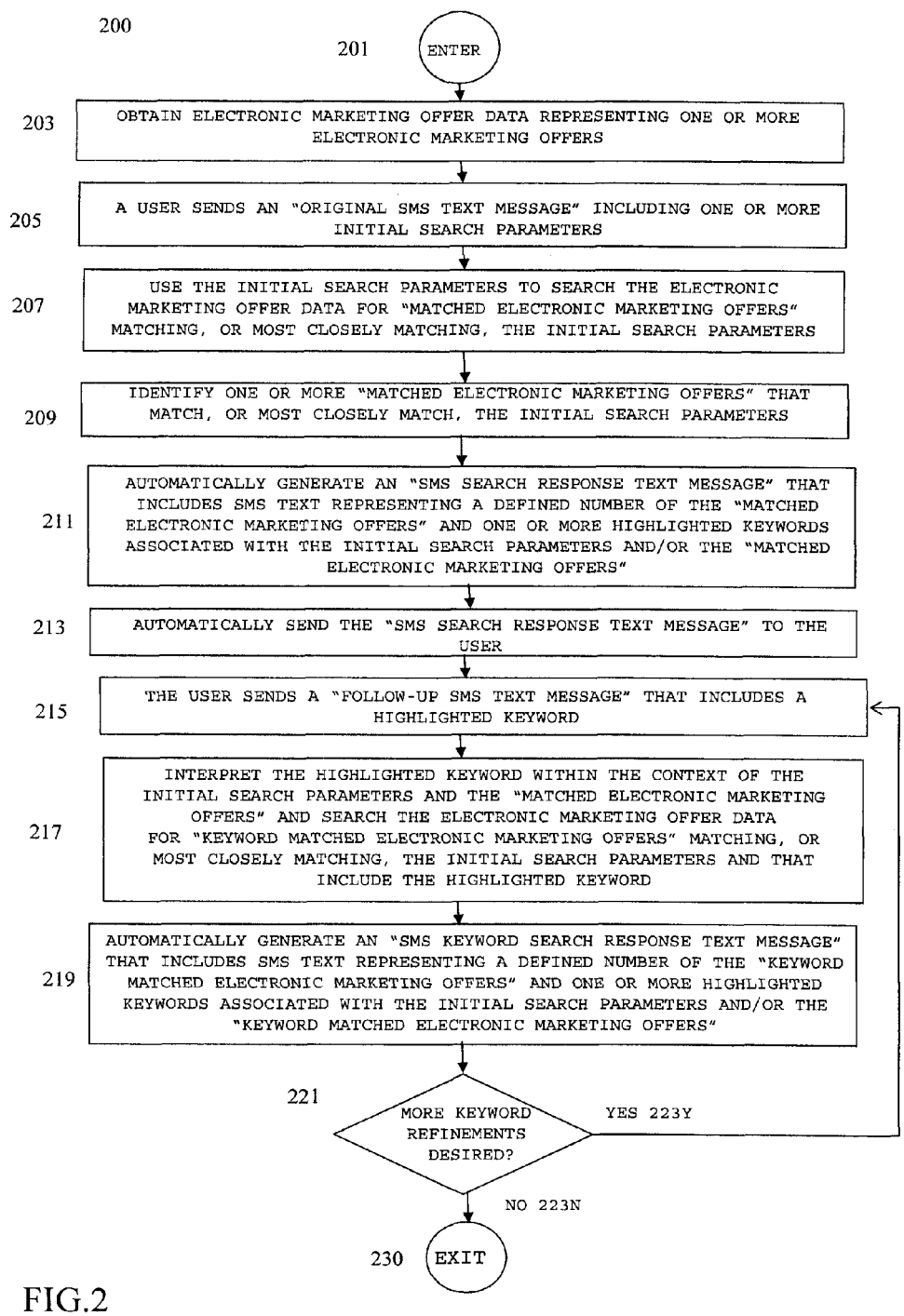
FIG. 2 is a flow chart depicting one embodiment of a process for providing an SMS-based interactive electronic marketing offer search and distribution system in accordance with one embodiment.

In one embodiment, memory system 123 includes all, or part of, a process for providing an SMS-based interactive electronic marketing offer search and distribution system, such as process 200 in FIG. 2.

In one embodiment, memory system 123 includes electronic marketing offer data 127, including one or more electronic marketing offers obtained from one or more sources, as discussed below.

In one embodiment, at least part of electronic marketing offer data 127 is provided to memory system 123 from database 170 via a network interface 131 and network 140. In one embodiment, network 140 is the Internet.

In one embodiment, memory system 123 includes SMS message/search thread 125 associated with a tread of related SMS messages and searches perform on behalf of user of mobile system 100 via two or more SMS messages, as discussed in more detail below. Those of skill in the art will note that SMS message/search thread 125 can be symbolic of multiple treads of related SMS messages and searches perform on behalf of multiple users, or a single user of mobile system 100, via multiple SMS messages, as discussed in more detail below.

In one embodiment, SMS message/search thread 125 includes initial parameters data 125A, received, in one embodiment via an "original SMS text message" from user mobile system 100 and a user of mobile system 100, as discussed in more detail below.

In one embodiment, SMS message/search thread 125 includes matched electronic marketing offers data 125B that, as discussed below, includes data representing "matched electronic marketing offers", i.e., electronic marketing offers matching, or most closely matching, the initial search parameters and as detected in a search of electronic marketing offer data 127 using initial parameters data 125A.

In one embodiment, SMS message/search thread 125 includes keywords data 125C that, as discussed below, includes one or more keywords highlighted in the matched electronic marketing offers data 125B.

In one embodiment, SMS message/search thread 125 includes keyword matching electronic marketing offers data 125D that, in one embodiment, as discussed below, includes data representing "keyword matched electronic marketing offers", i.e., electronic marketing offers matching, or most closely matching, the initial search parameters and as detected in a search of electronic marketing offer data 127 using initial parameters data 125A and that include one or more of the keywords of keywords data 125C.

In one embodiment, SMS message/search thread 125 includes SMS text messages data 125E that includes all, or part, of data associated with SMS messages generated by either party in the course of the electronic marketing device search associated with SMS message/search thread 125.

In one embodiment, electronic marketing offer computing system 120 is a backend server accessible by a user/consumer and/or a business and is used and/or accessible by another computing system, such as user mobile system 100.

In one embodiment, electronic marketing offer computing system 120 a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing an SMS-based interactive electronic marketing offer search and distribution system, and/or a computing system implemented data management system, in accordance with at least one of the embodiments as described herein.

In various embodiments, electronic marketing offer computing system 120 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, electronic marketing offer computing system 120 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, electronic marketing offer computing system 120 includes SMS/communications link interface 129 for connecting to SMS communications link 130. In one embodiment, SMS/communications link interface 129, and SMS communications link 130, provide electronic marketing offer computing system 120 the ability to send SMS text messages to, and receive SMS text messages from, mobile system 100.

SMS communications link 130 is any SMS communication link as discussed herein, and/or as known in the art at the time of filing, and/or as developed after the time of filing. As noted above, Short Message Service (SMS) is the text communication service component of phone, web, or mobile communication systems. As also noted above, SMS uses relatively ridged standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive electronic marketing offer search and distribution means. Consequently, the prevailing historical view was that an SMS-based interactive electronic marketing offer search and distribution system was impractical, if not impossible. Consequently, historically, electronic marketing offers sent via SMS were typically limited to one-way blast SMS messages that were static and were often considered an annoyance, to be largely ignored, by the receiving consumer/user.

Also shown in FIG. 1 is exemplary database 170. In one embodiment, database 170 is a data storage device, a designated server system or computing system, or a designated portion of one or more server systems or computing systems, such as computing system 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the user, and/or the user's agents, and/or process for providing an SMS-based interactive electronic marketing offer search and distribution system, such as exemplary process 200. As discussed in more detail below, in one embodiment, database 170 is under the control of the business owner/manager, and/or the business owner's/manager's agents.

In various embodiments, database 170 can contain all, or part, of any data related to process for providing an SMS-based interactive electronic marketing offer search and distribution system, such as exemplary process 200, as discussed herein, and/or as known in the art at the time of filing, and/or as developed after the time of filing.

As shown in FIG. 1, in one embodiment, electronic marketing offer computing system 120, and database 170, are coupled to network 140. Network 140 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In various embodiments, any one or more of user mobile system 100, electronic marketing offer computing system 120, and/or database 170 are part of a cloud computing environment.

Those of skill in the art will readily recognize that the components shown in FIG. 1, such as user mobile system 100, electronic marketing offer computing system 120, and/or databases 170, and their respective components, are shown for illustrative purposes only and that architectures with more or fewer components can implement, and benefit from, the invention. Moreover, one or more components of user mobile system 100, electronic marketing offer computing system 120, and/or database 170, may be located remotely from their respective system and accessed via network, as discussed herein. In addition, the particular type of, and configuration of, user mobile system 100, electronic marketing offer computing system 120, and/or database 170, are not relevant.

As discussed in more detail below, in one embodiment, a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200, are stored, in whole, or in part, in memory system 103 of user mobile system 100, and/or in memory system 123, and/or in database 170, and executed on user mobile system 100 and/or electronic marketing offer computing system 120. As used herein, a memory refers to a volatile memory, a non-volatile memory, or any combination of the two.

Although a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200 are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and/or 121. In one embodiment, execution of a process by processors 101 and/or 121 results in the operations of an agent computer process (not shown) and/or a rule computer process (not shown).

In one embodiment, a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as electronic marketing offer computing system 120 of FIG. 1, or other media or process capable of delivering computer readable data representing computer readable code, whether available or known at the time of filing or as later developed. This medium may belong to a computing system. However, in some embodiments, the medium also may be removable and/or remote from the computing system.

In one embodiment, the computing systems and/or server systems, such as computing system 120 running and/or utilizing and/or storing all, or part, of a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200, is a portable computer, a workstation, a two-way pager, a cellular telephone, a smart phone, a digital wireless telephone, a PDA, a server computer, an Internet appliance, or any other device that includes components that can execute all, or part, of a process for providing an SMS-based interactive electronic marketing offer search and distribution system in accordance with at least one of the embodiments as described herein. Similarly, in another embodiment, a process for providing an SMS-based interactive electronic marketing offer search and distribution system, such as process for providing an SMS-based interactive electronic marketing offer search and distribution system 200, and/or any data associated with a process for providing an SMS-based interactive electronic marketing offer search and distribution system, such as process for providing an SMS-based interactive electronic marketing offer search and distribution system 200, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "business", "merchant", "manager", "provider of products and services" and "seller", are used interchangeably and include, but are not limited to, providers of goods and services, and other advertisers, and/or any party and/or entity that interfaces with, and/or provides electronic marketing offers to, a process for providing an SMS-based interactive electronic marketing offer search and distribution system, and/or a person and/or entity that interfaces with, and/or provides electronic marketing offers to, a process for providing an SMS-based interactive electronic marketing offer search and distribution system, and/or any authorized agent of any party and/or person and/or entity that interfaces with, and/or provides electronic marketing offers to, a process for providing an SMS-based interactive electronic marketing offer search and distribution system.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile device" and/or "mobile computing system", or "mobile system" are used interchangeable and include, but are not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a process for providing an SMS-based interactive electronic marketing offer search and distribution system includes a process for providing an SMS-based interactive electronic marketing offer search and distribution system whereby, in one embodiment, electronic marketing offer data representing one or more electronic marketing offers is obtained from one or more sources.

In one embodiment, key features, and/or potential keywords, associated with the electronic marketing offer data and/or one or more electronic marketing offers are identified and associated with the respective electronic marketing offer data and/or one or more electronic marketing offers. In one embodiment, a user/consumer sends initial search parameter data in the form of SMS text in an "original SMS text message". In one embodiment, the "original SMS text message" includes an initial search parameter that indicates an item of interest, i.e., a product and/or service of interest, and for which the user/consumer would like to find electronic marketing offers. In one embodiment, the "original SMS text message" also includes one or more other initial search parameters associated with the item of interest, and/or the user/consumer, such as a location of the user/consumer. In one embodiment, the initial search parameter data from the "original SMS text message" is used to search the electronic marketing offer data representing one or more electronic marketing offers. In one embodiment, a "SMS search response text message" is automatically generated and sent back to the user/consumer that includes SMS text representing a defined number of the "top" "matched electronic marketing offers", i.e., electronic marketing offers matching, or most closely matching, the initial search parameters. In one embodiment, one or more keywords in the SMS text in the "SMS search response text message" representing the "matched electronic marketing offers" are bracketed, or otherwise highlighted, to indicate that more electronic marketing offers and/or information is available regarding the keywords. In one embodiment, if the user/consumer desires more information regarding the keywords, the user/consumer need only send a "follow-up SMS text message" back that includes the keyword, or an indicated phrase including the keyword. In one embodiment, the keywords are flexible and inferred within the context of "original SMS text message" and the initial search parameters. In one embodiment, if the user/consumer sends a "follow-up SMS text message" that includes the keyword, or an indicated phrase including the keyword, the data representing one or more electronic marketing offers is again searched for "keyword matched electronic marketing offers" not only matching the keyword but also matching, or consistent with the context of, the initial search parameters of the "original SMS text message" from the user/consumer, and/or the "matched electronic marketing offers". Consequently, using the "follow-up SMS text message", or subsequently "follow-up SMS messages", the user/consumer can select the highlighted keyword, and/or keyword phrase response, to define, and automatically request, a further refined search and, in one embodiment, these further refined searches are made using the added search parameters, in the form of the identified keywords, as interpreted within the context of all the initial parameters, and all keywords identified thus far. Consequently, in one embodiment, a series of linked, refined, and evolving electronic marketing offer searches are performed in association with a thread of SMS text messages to provide the user/consumer with a fully interactive electronic marketing offer search and distribution system using an SMS communication channel, and within the constraints of the SMS protocols.

FIG. 2 is a flow chart depicting a process for providing an SMS-based interactive electronic marketing offer search and distribution system 200 in accordance with one embodiment. Process for providing an SMS-based interactive electronic marketing offer search and distribution system 200 begins at ENTER OPERATION 201 of FIG. 2 and process flow proceeds to OBTAIN ELECTRONIC MARKETING OFFER DATA REPRESENTING ONE OR MORE ELECTRONIC MARKETING OFFERS OPERATION 203.

In one embodiment, at OBTAIN ELECTRONIC MARKETING OFFER DATA REPRESENTING ONE OR MORE ELECTRONIC MARKETING OFFERS OPERATION 203 electronic marketing offer data representing one or more electronic marketing offers is obtained from one or more sources.

In one embodiment, at OBTAIN ELECTRONIC MARKETING OFFER DATA REPRESENTING ONE OR MORE ELECTRONIC MARKETING OFFERS OPERATION 203 electronic marketing offer data, such as electronic marketing offer data 127 of FIG. 1, representing one or more electronic marketing offers is obtained from one or more sources.

Returning to FIG. 2, in one embodiment, at OBTAIN ELECTRONIC MARKETING OFFER DATA REPRESENTING ONE OR MORE ELECTRONIC MARKETING OFFERS OPERATION 203 the electronic marketing offer data is obtained by an electronic marketing offer computing system, e.g., a backend server system, such as electronic marketing offer computing system 120 of FIG. 1.

Returning to FIG. 2, in one embodiment, at OBTAIN ELECTRONIC MARKETING OFFER DATA REPRESENTING ONE OR MORE ELECTRONIC MARKETING OFFERS OPERATION 203 the electronic marketing offer data is obtained from one or businesses, providers of one or more products, and/or providers of one or more services via a network, such as the Internet or in the form of a computer program product. In one embodiment, at OBTAIN ELECTRONIC MARKETING OFFER DATA REPRESENTING ONE OR MORE ELECTRONIC MARKETING OFFERS OPERATION 203 the electronic marketing offer data is obtained in the form of Extensible Markup Language (XML) via a network, such as the Internet.

In one embodiment, at OBTAIN ELECTRONIC MARKETING OFFER DATA REPRESENTING ONE OR MORE ELECTRONIC MARKETING OFFERS OPERATION 203 one or more processors, such as processor 121 of FIG. 1, associated with one or more computing systems, such as electronic marketing offer computing system 120 of FIG. 1, identify parameters or "key features" associated with the electronic marketing offer data and/or one or more electronic marketing offers.

In various embodiments, the key features can include, but are not limited to, any one or more of the following: the type of item, i.e., the general and/or specific product or service associated with the electronic marketing offer, such as a Television (TV); a brand name or model name/number associated with the item, i.e., the brand name, model name, model line name, and/or model number of the specific product or service associated with the electronic marketing offer, such as Sony™ or Sony Brava™ or Sony Brava™ EX 400; dimensions and/or features associated with the item, i.e., the dimensions and/or features of the specific product or service associated with the electronic marketing offer, such as 32" LCD TV; a specific store, or chain of stores, associated with the item and/or the electronic marketing offer, such as "E-Zone" or "BestBuy"; a location associated with the item and/or the electronic marketing offer, such a "Jayanagar, India", or "Sunnyvale, Calif."; landmarks near the location associated with the item and/or the electronic marketing offer, such as "Opposite Chandra Sagar Choultry"; a retail or Manufacturer's Suggested Retail Price (MSRP) for the item, and/or the normal price of the item associated with the electronic marketing offer, absent the electronic marketing offer; the terms of the electronic marketing offer, such as the price of the item offered through the electronic marketing offer or special incentives provided through the electronic marketing offer such as free shipping, bundling etc.; restrictions associated with the electronic marketing offer such as expiration dates, bundling, minimum purchases, etc.; and/or any other key features identified by the electronic marketing offer computing system and/or as desired by the provider of the SMS-based interactive electronic marketing offer search and distribution system, and/or the provider of the electronic marketing offer.

In one embodiment, at OBTAIN ELECTRONIC MARKETING OFFER DATA REPRESENTING ONE OR MORE ELECTRONIC MARKETING OFFERS OPERATION 203 all, or some, of the key features identified in the electronic marketing offer data and/or one or more electronic marketing offers are also analyzed for potential use as keywords to be associated with an electronic marketing offer search as discussed below.

In one embodiment, at OBTAIN ELECTRONIC MARKETING OFFER DATA REPRESENTING ONE OR MORE ELECTRONIC MARKETING OFFERS OPERATION 203 the key features identified in the electronic marketing offer data and/or one or more electronic marketing offers are associated with the respective electronic marketing offer data and/or the respective electronic marketing offer and used to categorize, correlate, and store the electronic marketing offer data and/or one or more electronic marketing offers.

Below is a specific illustrative example of three electronic marketing offers as received, and processed, by an electronic marketing offer computing system, e.g., a backend server, such as electronic marketing offer computing system 120 of FIG. 1, in one embodiment. In this specific illustrative example the first offer is provided in XML and is for a Sony LCD TV having a 32 inch screen, a 32,000 rupee MSRP, an offer price of 28,000 rupees, and is being offered through/by the store "E-zone" located at Jayanagar 2nd Block opposite Chandra Sagar Choultry.

In this specific illustrative example, the identified key features of this specific offer, offer number 1, are: Brand=Sony; Feature=LCD; Size=32; Cost=32K; Sore=E-Zone; Location=Jayanagar 2nd Block; Landmark=Opposite Chandra Sagar Choultry; and Offer=28K. Consequently, in this specific illustrative example, this specific offer, offer number 1, is processed and/or stored by the electronic marketing offer computing system as:

```
<offerData>
  <offer id="1">
      <param name="brand"       value = "sony">
      <param name="feature"     value = "lcd">
      <param name="size"        value = "32">
      <param name="cost"        value = "32K">
   <text> Sony LCD 32" MRP Rs. 32,000 Offer Rs
28,000 </text>
   <store> E-zone </store>
   <location> Jayanagar 2nd Block </location>
   <landmark> Opposite Chandra Sagar Choultry
   </landmark>
```

In this specific illustrative example, the second offer is provided in XML and is for a LG LCD TV having a 28 inch screen, a 26,000 rupee MSRP, an offer price of 25,500 rupees, and is being offered through/by the store/provider "Griha Vaibhav" located at Jayanagar 5th Block near the JP Nagar Entrance.

In this specific illustrative example, the identified key features of this specific offer, offer number 2, are: Brand=LG; Feature=LCD; Size=28; Cost=26K; Sore=Griha Vaibhav; Location=Jayanagar 5th Block; Landmark=Near JP Nagar Entrance; and Offer=25.5K. Consequently, in this specific illustrative example, this specific offer, offer number 2, is processed and stored by the electronic marketing offer computing system as:

```
   </offer>
   <offer id="2">
      <param name="brand"       value = "LG">
      <param name="feature"     value = "lcd">
      <param name="size"        value = "28">
      <param name="cost"        value = "26K">
   <text> LG LCD 28" MRP 26,000 Offer 25,500
   </text>
   <store> Griha Vaibhav </store>
   <location> Jayanagar 5th Block </location>
   <landmark> Near JP Nagar Entrance </landmark>
```

In this specific illustrative example, the third offer is provided in XML and is for a Sony HDTV having a 50 inch screen, a 30,000 rupee MSRP, an offer price of 27,000 rupees, and is being offered through/by the store/provider "Manjunatha" located at Jayanagar 4th Block.

In this specific illustrative example, the identified key features of this specific offer, offer number 3, are: Brand=Sony; Feature=HDTV; Size=50; Cost=30K; Sore=Manjunatha; Location=Jayanagar 4th Block; Landmark=none; and Offer=27K. Consequently, in this specific illustrative example, this specific offer, offer number 3, is processed and stored by the electronic marketing offer computing system as:

```
<offerData>
  <offer id="3">
      <param name="brand"       value = "sony">
      <param name="feature"     value = "HDTV">
      <param name="size"        value = "50">
      <param name="cost"        value = "30K">
   <text> Sony HDTV 50" MRP Rs. 30,000 Offer Rs
27,000 </text>
   <store> Manjunatha </store>
   <location> Jayanagar 4th Block </location>
   <landmark> none </landmark>
```

In one embodiment, given the XML representation of the three specific illustrative electronic marketing offers, offer number 1, offer number 2, and offer number 3, shown above, the electronic marketing offer computing system, e.g., the backend server, automatically generates links between the three electronic marketing offers and the electronic marketing offers can be looked up along any of the key features identified in the XMLs above.

As can also be seen in the specific illustrative example above, in one embodiment, even if the electronic marketing offer data is in free text form, the electronic marketing offer computing system, e.g., the backend server, can extract the relevant entities, i.e., the key features/keywords from the text to structure the data in the above XML format for the SMS-based interactive electronic marketing offer search and distribution system to use.

Returning to FIG. 2, in one embodiment, once electronic marketing offer data representing one or more electronic marketing offers is obtained from one or more sources at OBTAIN ELECTRONIC MARKETING OFFER DATA REPRESENTING ONE OR MORE ELECTRONIC MARKETING OFFERS OPERATION 203 process flow proceeds to A USER SENDS AN "ORIGINAL SMS TEXT MESSAGE" INCLUDING ONE OR MORE INITIAL SEARCH PARAMETERS OPERATION 205.

In one embodiment, at A USER SENDS AN "ORIGINAL SMS TEXT MESSAGE" INCLUDING ONE OR MORE INITIAL SEARCH PARAMETERS OPERATION 205 a user/consumer sends initial search parameter data in the form of SMS text in an "original SMS text message".

In one embodiment, at A USER SENDS AN "ORIGINAL SMS TEXT MESSAGE" INCLUDING ONE OR MORE INITIAL SEARCH PARAMETERS OPERATION 205 a user/consumer sends initial search parameter data in the form of SMS text in an "original SMS text message" to the SMS-based interactive electronic marketing offer search and distribution system.

As noted above, Short Message Service (SMS) is the text communication service component of phone, web, or mobile communication systems. As also noted above, SMS uses relatively ridged standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive electronic marketing offer search and distribution means. Consequently, the prevailing historical view was that an SMS-based interactive electronic marketing offer search and distribution system was impractical, if not impossible. Consequently, historically, electronic marketing offers sent via SMS were typically limited to one-way blast SMS messages that were static and were often considered an annoyance, to be largely ignored, by the receiving consumer/user.

In one embodiment, the original SMS text message of A USER SENDS AN "ORIGINAL SMS TEXT MESSAGE" INCLUDING ONE OR MORE INITIAL SEARCH PARAMETERS OPERATION 205 sent by the user/consumer to the SMS-based interactive electronic marketing offer search and distribution system includes an initial search parameter that indicates an item of interest, i.e., a product and/or service of interest, and for which the user/consumer would like to find electronic marketing offers.

In one embodiment, the original SMS text message of A USER SENDS AN "ORIGINAL SMS TEXT MESSAGE" INCLUDING ONE OR MORE INITIAL SEARCH PARAMETERS OPERATION 205 sent by the user/consumer to the SMS-based interactive electronic marketing offer search and distribution system of also includes one or more other initial search parameters associated with the item of interest, and/or the user/consumer.

In various embodiments, the one or more other initial search parameters associated with the item of interest, and/or the user/consumer include, but are not limited to, one or more of: the user's/consumer's location, or a desired location; any key dimensions, sizes, features, associated with the item of interest; a brand name or model associated with the item of interest; or any other desired search parameter associated with the item of interest that can be set forth in an SMS text format, and under SMS text message constraints, in a single SMS text message.

Continuing with the one specific illustrative example discussed above, an illustrative example of an original SMS text message sent to the SMS-based interactive electronic marketing offer search and distribution system by a given user/consumer looking for a TV in Jayanagar, India, could be as simple as "Find TV Jayanagar". In this specific example, the initial search parameter data includes "TV" and "Jayanagar".

In one embodiment, once a user/consumer sends initial search parameter data in the form of SMS text in an "original SMS text message" at A USER SENDS AN "ORIGINAL SMS TEXT MESSAGE" INCLUDING ONE OR MORE INITIAL SEARCH PARAMETERS OPERATION 205 process flow proceeds to USE THE INITIAL SEARCH PARAMETERS TO SEARCH THE ELECTRONIC MARKETING OFFER DATA FOR "MATCHED ELECTRONIC MARKETING OFFERS" MATCHING, OR MOST CLOSELY MATCHING, THE INITIAL SEARCH PARAMETERS OPERATION 207.

In one embodiment, at USE THE INITIAL SEARCH PARAMETERS TO SEARCH THE ELECTRONIC MARKETING OFFER DATA FOR "MATCHED ELECTRONIC MARKETING OFFERS" MATCHING, OR MOST CLOSELY MATCHING, THE INITIAL SEARCH PARAMETERS OPERATION 207 the initial search parameter data from the "original SMS text message" of A USER SENDS AN "ORIGINAL SMS TEXT MESSAGE" INCLUDING ONE OR MORE INITIAL SEARCH PARAMETERS OPERATION 205 is used to search the electronic marketing offer data representing one or more electronic marketing offers A USER SENDS AN "ORIGINAL SMS TEXT MESSAGE" INCLUDING ONE OR MORE INITIAL SEARCH PARAMETERS OPERATION 205.

In one embodiment, at USE THE INITIAL SEARCH PARAMETERS TO SEARCH THE ELECTRONIC MARKETING OFFER DATA FOR "MATCHED ELECTRONIC MARKETING OFFERS" MATCHING, OR MOST CLOSELY MATCHING, THE INITIAL SEARCH PARAMETERS OPERATION 207 the initial search parameter data from original SMS text message of A USER SENDS AN "ORIGINAL SMS TEXT MESSAGE" INCLUDING ONE OR MORE INITIAL SEARCH PARAMETERS OPERATION 205 is used to search the electronic marketing offer data representing one or more electronic marketing offers, such as electronic marketing offer data 127 of FIG. 1, by one or more processors, such as processor 121, associated with one or more computing systems, such electronic marketing offer computing system 120 of FIG. 1.

Returning to FIG. 2, in one embodiment, once the initial search parameter data from the "original SMS text message" is used to search the electronic marketing offer data representing one or more electronic marketing offers at USE THE INITIAL SEARCH PARAMETERS TO SEARCH THE ELECTRONIC MARKETING OFFER DATA FOR "MATCHED ELECTRONIC MARKETING OFFERS" MATCHING, OR MOST CLOSELY MATCHING, THE INITIAL SEARCH PARAMETERS OPERATION 207 process flow proceeds to IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209.

In one embodiment, at IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209, as a result of the search of the electronic marketing offer data representing one or more electronic marketing offers of USE THE INITIAL SEARCH PARAMETERS TO SEARCH THE ELECTRONIC MARKETING OFFER DATA FOR "MATCHED ELECTRONIC MARKETING OFFERS" MATCHING, OR MOST CLOSELY MATCHING, THE INITIAL SEARCH PARAMETERS OPERATION 207, one or more "matched electronic marketing offers" that match, or most closely match, the initial search parameter data are identified.

In one embodiment, once one or more "matched electronic marketing offers" that match, or most closely match, the initial search parameter data are identified at IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209 process flow proceeds to AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 an "SMS search response text message" is automatically generated that includes SMS text representing a defined number of the "top" "matched electronic marketing offers", i.e., electronic marketing offers matching, or most closely matching, the initial search parameters and one or more highlighted keywords.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 a defined number of the "top" or most closely matched "matched electronic marketing offers" of IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209 are selected.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 the defined number of the most closely matched "matched electronic marketing offers" is chosen based on the limitations imposed by the SMS protocol. As an example, in one embodiment the two most closely matched "matched electronic marketing offers" are selected. In another example, in one embodiment, the three most closely matched "matched electronic marketing offers" are selected.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 the selected "matched electronic marketing offers" are specially formatted with keywords highlighted. In one embodiment, the selected "matched electronic marketing offers" are specially formatted with keywords highlighted by one or more processors, such as processor 121 of FIG. 1, associated with one or more computing systems, such as electronic marketing offer computing system 120 of FIG. 1.

Returning to FIG. 2, as noted above, in one embodiment, one or more "keywords" in the selected "matched electronic marketing offers" of the "SMS search response text message" are bracketed, or otherwise highlighted. In one embodiment, the bracketing or other highlighting is used to indicate to the user/consumer that more electronic marketing offers and/or information is available regarding the keywords.

As discussed below, in one embodiment, if the user/consumer desires more electronic marketing offers and/or information associated with a bracketed, or otherwise highlighted, keyword, the user/consumer need only send back a "follow-up SMS text message" that includes the bracketed, or otherwise highlighted, keyword, or an indicated phrase including the keyword.

Continuing with the one specific illustrative example discussed above, recall that the illustrative example of an original SMS text message sent to the SMS-based interactive electronic marketing offer search and distribution system by a given user/consumer looking for a TV in Jayanagar, India, read "Find TV Jayanagar" and, therefore, the initial search parameter data included "TV" and "Jayanagar".

In this specific illustrative example, the three specific illustrative offers, i.e., offer number 1, offer number 2, and offer number 3, would match the initial search parameter data of "TV" and "Jayanagar". Recall that, in this specific example, offer number 1, was processed and/or stored by the electronic marketing offer computing system as:

```
<offerData>
<offer id="1">
    <param name="brand"          value ="sony">
    <param name="feature"        value = "lcd">
    <param name="size"           value = "32">
    <param name="cost"           value = "32K">
<text> Sony LCD 32" MRP Rs. 32,000 Offer Rs
28,000 </text>
<store> E-zone </store>
<location> Jayanagar 2nd Block </location>
<landmark> Opposite Chandra Sagar Choultry
</landmark>
```

Further recall that, in this specific example, offer number 2, was processed and/or stored by the electronic marketing offer computing system as:

```
</offer>
<offer id="2">
    <param name="brand"          value = "LG">
    <param name="feature"        value = "lcd">
    <param name="size"           value = "28">
    <param name="cost"           value = "26K">
<text> LG LCD 28" MRP 26,000 Offer 25,500
</text>
<store> Griha Vaibhav </store>
<location> Jayanagar 5th Block </location>
<landmark> Near JP Nagar Entrance </landmark>
```

Further recall that, in this specific example, offer number 3, was processed and/or stored by the electronic marketing offer computing system as:

```
<offerData>
<offer id="3">
    <param name="brand"          value = "sony">
    <param name="feature"        value = "HDTV">
    <param name="size"           value = "50">
    <param name="cost"           value = "30K">
<text> Sony HDTV 50" MRP Rs. 30,000 Offer Rs
27,000 </text>
<store> Manjunatha </store>
<location> Jayanagar 4th Block </location>
<landmark> none </landmark>
```

In this specific illustrative example, it is further stipulated that only offer number 1 and offer number 2 are initially selected as "matched electronic marketing offers". Consequently, an illustrative example of an "SMS search response text message" generated by one or more processors associated with the electronic marketing offer computing system at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 would include the following text:

"[Sony] LCD 32" MRP 32,000 Offer 28,000 @@ E-zone Jayanagar 2nd Block"
"LG [LCD] 28" MRP 26,000 Offer 25,500 @@ Griha Vaibhav Jayanagar 5th Block"

As seen above, both the words "Sony" and "LCD" are keywords and are therefore bracketed as "[Sony]" and "[LCD]" indicating that more electronic marketing offers and/or information are available for both the keywords "Sony" and "LCD".

In one embodiment, the keywords are flexibly selected and defined and are inferred from the context of original SMS text message and the initial search parameters by one or more processors, such as processor 121 of FIG. 1, associated with one or more computing systems, such as electronic marketing offer computing system 120 of FIG. 1.

Returning to FIG. 2, in one embodiment, once an "SMS search response text message" is automatically generated that includes SMS text representing a defined number of the "top" "matched electronic marketing offers", i.e., electronic marketing offers matching, or most closely matching, the initial search parameters and one or more highlighted keywords at AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 process flow proceeds to AUTOMATICALLY SEND THE "SMS SEARCH RESPONSE TEXT MESSAGE" TO THE USER OPERATION 213.

In one embodiment, at AUTOMATICALLY SEND THE "SMS SEARCH RESPONSE TEXT MESSAGE" TO THE USER OPERATION 213 the "SMS search response text message" automatically generated that includes SMS text representing a defined number of the "top" "matched electronic marketing offers", i.e., electronic marketing offers matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 is automatically sent to the user/consumer via an SMS communication link.

In one embodiment, at AUTOMATICALLY SEND THE "SMS SEARCH RESPONSE TEXT MESSAGE" TO THE USER OPERATION 213 the "SMS search response text message" automatically generated that includes SMS text representing a defined number of the "top" "matched electronic marketing offers", i.e., electronic marketing offers matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 is automatically sent by one or more processors, such as processor 121 of FIG. 1, associated with one or more computing systems, such as electronic marketing offer computing system 120 of FIG. 1, to the user/consumer, such as user mobile system 100 of FIG. 1 via an SMS communication link, such as SMS communications link 130 of FIG. 1.

Returning to FIG. 2, in one embodiment, once the "SMS search response text message" automatically generated that includes SMS text representing a defined number of the "top" "matched electronic marketing offers", i.e., electronic marketing offers matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ELECTRONIC MARKETING OFFERS" AND ONE OR MORE HIGHLIGHTED KEYWORDS ASSOCIATED WITH THE INITIAL SEARCH PARAMETERS AND/OR THE "MATCHED ELECTRONIC MARKETING OFFERS" OPERATION 211 is automatically sent to the user/consumer via an SMS communication link at AUTOMATICALLY SEND THE "SMS SEARCH RESPONSE TEXT MESSAGE" TO THE USER OPERATION 213, process flow proceeds to THE USER SENDS A "FOLLOW-UP SMS TEXT MESSAGE" THAT INCLUDES A HIGHLIGHTED KEYWORD OPERATION 215.

In one embodiment, at THE USER SENDS A "FOLLOW-UP SMS TEXT MESSAGE" THAT INCLUDES A HIGHLIGHTED KEYWORD OPERATION 215 the user/consumer sends a "follow-up SMS text message" that includes the keyword, or an indicated phrase including the keyword, of AUTOMATICALLY SEND THE "SMS SEARCH RESPONSE TEXT MESSAGE" TO THE USER OPERATION 213.

In one embodiment, at THE USER SENDS A "FOLLOW-UP SMS TEXT MESSAGE" THAT INCLUDES A HIGHLIGHTED KEYWORD OPERATION 215 the user/consumer sends a "follow-up SMS text message" that includes the keyword, or an indicated phrase including the keyword, via a user mobile system, such as user mobile system 100 of FIG. 1, and an SMS communication link, such as SMS communications link 130 of FIG. 1.

Continuing with the one specific illustrative example discussed above, recall that, in this specific example, the "SMS search response text message" sent via SMS by one or more processors associated with the electronic marketing offer computing system included the keywords "[Sony]" and "[LCD]". Consequently, in this specific example, the "follow-up SMS text message" could include the follow-up phrase "more sony" indicating the user/consumer desires more electronic marketing offers and/or information associated with the brand "Sony".

Returning to FIG. 2, in one embodiment, once the user/consumer sends a "follow-up SMS text message" that includes the keyword, or an indicated phrase including the keyword, of AUTOMATICALLY SEND THE "SMS SEARCH RESPONSE TEXT MESSAGE" TO THE USER OPERATION 213 at THE USER SENDS A "FOLLOW-UP SMS TEXT MESSAGE" THAT INCLUDES A HIGHLIGHTED KEYWORD OPERATION 215, process flow proceeds to INTERPRET THE HIGHLIGHTED KEYWORD WITHIN THE CONTEXT OF THE INITIAL SEARCH PARAMETERS AND THE "MATCHED ELECTRONIC MARKETING OFFERS" AND SEARCH THE ELECTRONIC MARKETING OFFER DATA FOR "KEYWORD MATCHED ELECTRONIC MARKETING OFFERS" MATCHING, OR MOST CLOSELY MATCHING, THE INITIAL SEARCH PARAMETERS AND THAT INCLUDE THE HIGHLIGHTED KEYWORD OPERATION 217.

In one embodiment, at INTERPRET THE HIGHLIGHTED KEYWORD WITHIN THE CONTEXT OF THE INITIAL SEARCH PARAMETERS AND THE "MATCHED ELECTRONIC MARKETING OFFERS" AND SEARCH THE ELECTRONIC MARKETING OFFER DATA FOR "KEYWORD MATCHED ELECTRONIC MARKETING OFFERS" MATCHING, OR MOST CLOSELY MATCHING, THE INITIAL SEARCH PARAMETERS AND THAT INCLUDE THE HIGHLIGHTED KEYWORD OPERATION 217 the data representing one or more electronic marketing offers of OBTAIN ELECTRONIC MARKETING OFFER DATA REPRESENTING ONE OR MORE ELECTRONIC MARKETING OFFERS OPERATION 203 is again searched for "keyword matched electronic marketing offers" that not only match, or include, using the keyword of THE USER SENDS A "FOLLOW-UP SMS TEXT MESSAGE" THAT INCLUDES A HIGHLIGHTED KEYWORD OPERATION 215 but also match, or are consistent with the context of, the initial search parameters of the "original SMS text message" from the user/consumer of A USER SENDS AN "ORIGINAL SMS TEXT MESSAGE" INCLUDING ONE OR MORE INITIAL SEARCH PARAMETERS OPERATION 205, and/or the "matched electronic marketing offers" of IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209.

In one embodiment, at INTERPRET THE HIGHLIGHTED KEYWORD WITHIN THE CONTEXT OF THE INITIAL SEARCH PARAMETERS AND THE "MATCHED ELECTRONIC MARKETING OFFERS" AND SEARCH THE ELECTRONIC MARKETING OFFER DATA FOR "KEYWORD MATCHED ELECTRONIC MARKETING OFFERS" MATCHING, OR MOST CLOSELY MATCHING, THE INITIAL SEARCH PARAMETERS AND THAT INCLUDE THE HIGHLIGHTED KEYWORD OPERATION 217 the data representing one or more electronic marketing offers is again searched for "keyword matched electronic marketing offers" that not only match, or include, the keyword, but also match, or are consistent with the context of, the initial search parameters of the "original SMS text message" from the user/consumer, and/or the "matched electronic marketing offers" one or more processors, such as processor 121 of FIG. 1, associated with one or more computing systems, such as electronic marketing offer computing system 120 of FIG. 1.

Returning to FIG. 2, in one embodiment, once the data representing one or more electronic marketing offers of OBTAIN ELECTRONIC MARKETING OFFER DATA REPRESENTING ONE OR MORE ELECTRONIC MARKETING OFFERS OPERATION 203 is again searched for "keyword matched electronic marketing offers" that not only match, or include, the keyword of THE USER SENDS A "FOLLOW-UP SMS TEXT MESSAGE" THAT INCLUDES A HIGHLIGHTED KEYWORD OPERATION 215 but also match, or are consistent with the context of, the initial search parameters of the "original SMS text message" from the user/consumer of A USER SENDS AN "ORIGINAL SMS TEXT MESSAGE" INCLUDING ONE OR MORE INITIAL SEARCH PARAMETERS OPERATION 205, and/or the "matched electronic marketing offers" of IDENTIFY ONE OR MORE "MATCHED ELECTRONIC MARKETING OFFERS" THAT MATCH, OR MOST CLOSELY MATCH, THE INITIAL SEARCH PARAMETERS OPERATION 209 at INTERPRET THE HIGHLIGHTED KEYWORD WITHIN THE CONTEXT OF THE INITIAL SEARCH PARAMETERS AND THE "MATCHED ELECTRONIC MARKETING OFFERS" AND SEARCH THE ELECTRONIC MARKETING OFFER DATA FOR "KEYWORD MATCHED ELECTRONIC MARKETING OFFERS" MATCHING, OR MOST CLOSELY MATCHING, THE INITIAL SEARCH PARAMETERS AND THAT INCLUDE THE HIGHLIGHTED KEYWORD OPERATION 217, process flow proceeds to AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 an "SMS keyword search response text message" is automatically generated and sent to the user/consumer that includes SMS text representing a defined number of the "top" or most closely matched "keyword matched electronic marketing offers" of INTERPRET THE HIGHLIGHTED KEYWORD WITHIN THE CONTEXT OF THE INITIAL SEARCH PARAMETERS AND THE "MATCHED ELECTRONIC MARKETING OFFERS" AND SEARCH THE ELECTRONIC MARKETING OFFER DATA FOR "KEYWORD MATCHED ELECTRONIC MARKETING OFFERS" MATCHING, OR MOST CLOSELY MATCHING, THE INITIAL SEARCH PARAMETERS AND THAT INCLUDE THE HIGHLIGHTED KEYWORD OPERATION 217.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219, as a result of the search of the electronic marketing offer data representing one or more electronic marketing offers using the keyword designated in the "follow-up SMS text message", one or more "keyword matched electronic marketing offers" that include the designated keyword and match, or most closely match, the initial search parameter data are identified and a defined number of the "top" or most closely matched "keyword matched electronic marketing offers" are selected.

In one embodiment, AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 the defined number of the most closely matched "keyword matched electronic marketing offers" is chosen based on the limitations imposed by the SMS protocol. As an example, in one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219, the two most closely matched "keyword matched electronic marketing offers" are selected. In another example, in one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 the three most closely matched "keyword matched electronic marketing offers" are selected.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 the selected "keyword matched electronic marketing offers" are again specially formatted with keywords highlighted and sent to user/consumer in a "SMS keyword search response text message" via SMS. In one embodiment, the selected "keyword matched electronic marketing offers" are specially formatted with keywords highlighted and automatically sent to user/consumer in a "SMS keyword search response text message" via SMS by one or more processors, such as processor 121 of FIG. 1, associated with an electronic marketing offer computing system, such as electronic marketing offer computing system 120 of FIG. 1.

Continuing with the one specific illustrative example discussed above, recall that offer number 3 was not selected as a one of the "matched electronic marketing offers" in the "SMS search response text message". further recall that offer number 3 was processed and stored by the electronic marketing offer computing system as:

```
<offerData>
    <offer id="3">
        <param name="brand"      value = "sony">
        <param name="feature"    value = "HDTV">
        <param name="size"       value = "50">
        <param name="cost"       value = "30K">
    <text> Sony HDTV 50" MRP Rs. 30,000 Offer Rs 27,000 </text>
    <store> Manjunatha </store>
    <location> Jayanagar 4th Block </location>
    <landmark> none </landmark>
```

Further recall that the user/consumer's "follow-up SMS text message" included the follow-up phrase "more sony" indicating the user/consumer desired more electronic marketing offers and/or information associated with the brand "Sony". Consequently, in this specific illustrative example, the "SMS keyword search response text message" would include the following text indicating the "keyword matched electronic marketing offers" of offer number 1 and offer number 3, with offer number 2, to an LG TV, having been dropped:

```
"[Sony] LCD 32" MRP 32,000 Offer 28,000 @@ E-
zone Jayanagar 2nd Block"
"[Sony] [HDTV] 50" MRP 30,000 Offer 27,000 @@
Manjunatha Jayanagar 4th Block "
```

As seen above, both the words "Sony" and now "HDTV" are keywords and are therefore bracketed as "[Sony]" and "[HDTV]" indicating that more electronic marketing offers and/or information are available for both the keywords "Sony" and "HDTV".

In one embodiment, should the user/consumer desire to begin a new search, i.e., to reset the entire search and interaction process, the user/consumer need only resend the original SMS text message with initial search parameters.

Returning to FIG. 2, in various embodiments, the exchange of "follow-up SMS text messages" including designated keywords, or keyword response phrases, of THE USER SENDS A "FOLLOW-UP SMS TEXT MESSAGE" THAT INCLUDES A HIGHLIGHTED KEYWORD OPERATION 215 and "SMS keyword search response text messages" including "keyword matched electronic marketing offers" and additional highlighted keywords of AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 can be repeated as many times as the user/consumer desires until the desired level of electronic offer specificity is attained. Consequently, in the "follow-up SMS text message", or subsequent "follow-up SMS text messages", the user/consumer can use the highlighted keywords to define, and automatically request, further refined searches and, in one embodiment, these further refined searches are performed while interpreting the added search parameters, in the form of the identified keywords, within the context of all the initial parameters, and all keywords, identified thus far.

In one embodiment, once an "SMS keyword search response text message" is automatically generated and sent to the user/consumer that includes SMS text representing a defined number of the "top" or most closely matched "keyword matched electronic marketing offers" at AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219, process flow proceeds to MORE KEYWORD REFINEMENTS DESIRED? OPERATION 221.

In one embodiment, at MORE KEYWORD REFINEMENTS DESIRED? OPERATION 221 the exchange of "follow-up SMS text messages" including designated keywords, or keyword response phrases, of THE USER SENDS A "FOLLOW-UP SMS TEXT MESSAGE" THAT INCLUDES A HIGHLIGHTED KEYWORD OPERATION 215 and "SMS keyword search response text messages" including "keyword matched electronic marketing offers" and additional highlighted keywords of AUTOMATICALLY GENERATE AN "SMS KEYWORD SEARCH RESPONSE TEXT MESSAGE" THAT INCLUDES SMS TEXT REPRESENTING A DEFINED NUMBER OF THE "KEYWORD MATCHED ELECTRONIC MARKETING OFFERS" AND ONE OR MORE HIGHLIGHTED KEYWORDS ASSOCIATED WITH THE INITIAL SEARCH PARAMETERS AND/OR THE "KEYWORD MATCHED ELECTRONIC MARKETING OFFERS" OPERATION 219 can be repeated as many times as the user/consumer desires until the desired level of electronic offer specificity is attained by taking path 223Y, indicating "yes" the user/consumer desires to send another "follow-up SMS text message" including designated keywords, or keyword response phrases, and process proceeds back to THE USER SENDS A "FOLLOW-UP SMS TEXT MESSAGE" THAT INCLUDES A HIGHLIGHTED KEYWORD OPERATION 215.

As noted above, by repeatedly taking path 223Y, indicating "yes" the user/consumer desires to send another "follow-up SMS text message" including designated keywords, or keyword response phrases, and repeated returning the process back to THE USER SENDS A "FOLLOW-UP SMS TEXT MESSAGE" THAT INCLUDES A HIGHLIGHTED KEYWORD OPERATION 215, a thread, or tree, of related electronic marketing offer searches associated with a thread of SMS text messages is created to provide the user/consumer with a fully interactive electronic marketing offer search and distribution system using an SMS communication channel, and within the constraints of the SMS protocols.

In various embodiments, once the user has obtained a desired electronic marketing offer, and/or has attained the desired level of electronic offer specificity, path 233N is taken, indicating "no" the user/consumer does not desire to send another "follow-up SMS text message" including designated keywords, or keyword response phrases.

In one embodiment, once the user has obtained a desired electronic marketing offer, and/or has attained the desired level of electronic offer specificity, and path 233N is taken, indicating "no" the user/consumer does not desire to send another "follow-up SMS text message" including designated keywords, or keyword response phrases, process flow proceeds to EXIT OPERATION 230.

In one embodiment, at EXIT OPERATION 230 process for providing an SMS-based interactive electronic marketing offer search and distribution system 200 is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process for providing an SMS-based interactive electronic marketing offer search and distribution system 200, keywords are flexibly and dynamically defined, inferred, selected, and interpreted, by the content, and within the context, of the set of SMS text messages sent and the electronic marketing offers themselves. Consequently, the SMS-based interactive electronic marketing offer search and distribution systems provided using process for providing an SMS-based interactive electronic marketing offer search and distribution system 200 are user friendly and their use/operation is intuitive for the user/consumer.

In addition, as discussed above, using process for providing an SMS-based interactive electronic marketing offer search and distribution system 200, a thread of electronic marketing offer searches associated with a thread of SMS text messages is created to provide the user/consumer with a fully interactive electronic marketing offer search and distribution system using an SMS communication channel, and within the constraints of the SMS protocols. Consequently, the severe limitations of SMS communication channels that had historically prevented SMS channels from being used as an interactive electronic marketing offer search and distribution means are overcome. Therefore, using process for providing an SMS-based interactive electronic marketing offer search and distribution system 200, many users/consumer in areas of the world having emerging economies can be provided more of the benefits of the information age and the benefits of interactive electronic marketing offer searches and distribution.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "searching", "identifying", "interpreting", "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing an SMS-based interactive electronic marketing offer search and distribution system comprising:

a computing system obtaining electronic marketing data representing one or more electronic marketing offers;

a computing system receiving an original SMS text message from a user via an SMS communication link, the original SMS text message including at least one initial search parameter;

identifying, through a search of the electronic marketing data and by using one more processors associated with one or more computing systems, one or more matched electronic marketing offers that match, or most closely match, the at least one initial search parameter in the electronic marketing data;

selecting, using one more processors associated with one or more computing systems, a defined number of the identified matched electronic marketing offers to be sent to the user;

analyzing, using one more processors associated with one or more computing systems, the selected matched electronic marketing offers and the electronic marketing data to identify one or more keywords in the selected matched electronic marketing offers, the keywords being associated with additional electronic marketing offers and/or information;

identifying, using one more processors associated with one or more computing systems, one or more keywords in the selected matched electronic marketing offers;

generating, using one more processors associated with one or more computing systems, an SMS search response message that includes SMS text representing the matched electronic marketing offers and at least one keyword of the one or more identified keywords with the at least one keyword being highlighted by one or more highlighting methods to distinguish the at least one keyword from the other SMS text;

sending, using one more processors associated with one or more computing systems, the SMS search response message to the user via an SMS communications link;

receiving, at the computing system, a follow-up SMS text message from the user via an SMS communications link, the follow-up SMS text message including a user selected keyword from the SMS search response message;

interpreting, using one more processors associated with one or more computing systems, the user selected keyword in light of the content, and context, of the matched electronic marketing offers and the initial search parameters and then use the user selected keyword and the initial search parameters to perform an additional search of the electronic marketing data for one or more keyword matched electronic marketing offers that match, or most closely match, the at least one initial search parameter and include the user selected keyword;

identifying, using one more processors associated with one or more computing systems, one or more keyword matched electronic marketing offers that match, or most closely match, the at least one initial search parameter in the electronic marketing data and include the user selected keyword;

selecting, using one more processors associated with one or more computing systems, a defined number of the identified keyword matched electronic marketing offers to be sent to the user;

analyzing, using one more processors associated with one or more computing systems, the selected keyword matched electronic marketing offers and the electronic marketing data to identify additional keywords in the selected keyword matched electronic marketing offers, the additional keywords being associated with additional electronic marketing offers and/or information;

generating, using one more processors associated with one or more computing systems, an SMS keyword search response message that includes SMS text representing the matched electronic marketing offers and, if additional keywords were identified, at least one additional keyword of the identified additional keywords, with any additional keywords being highlighted by one or more highlighting methods to distinguish the additional keywords from the other SMS text;

sending, using one more processors associated with one or more computing systems, the SMS keyword search response message to the user via an SMS communications link; and for each new follow-up SMS text message from the user, using one more processors associated with one or more computing systems to repeat the process from receiving a follow-up SMS text message from the user via an SMS communications link on until the user accepts an identified keyword matched electronic marketing offer and/or the user fails to respond with a follow-up SMS text message.

2. The computing system implemented process for providing an SMS-based interactive electronic marketing offer search and distribution system of claim 1, wherein;

at least part of the electronic marketing data representing one or more electronic marketing offers is obtained from one or businesses.

3. The computing system implemented process for providing an SMS-based interactive electronic marketing offer search and distribution system of claim 1, wherein;

at least part of the electronic marketing data representing one or more electronic marketing offers is in the form of Extensible Markup Language (XML).

4. The computing system implemented process for providing an SMS-based interactive electronic marketing offer search and distribution system of claim 1, wherein;

at least part of the electronic marketing data is analyzed to identify one or more key features associated with the electronic marketing data and the one or more key features are used to correlate and categorize the one or more electronic marketing offers represented by the electronic marketing data.

5. The computing system implemented process for providing an SMS-based interactive electronic marketing offer search and distribution system of claim 4, wherein;

at least one of the key features associated with the electronic marketing data is selected from the group of key features consisting of:

the type of item being offered;

a brand name or model name/number associated with the item;

dimensions or features associated with the item;

one or more stores associated with the item or the electronic marketing offer;

a location associated with the item or the electronic marketing offer;

landmarks near the location associated with the item or the electronic marketing offer;

a retail or Manufacturer's Suggested Retail Price (MSRP) for the item; and the terms of the electronic marketing offer.

6. The computing system implemented process for providing an SMS-based interactive electronic marketing offer search and distribution system of claim 1, wherein;

the at least one initial search parameter includes the name of the item of interest and the location of the user.

7. The computing system implemented process for providing an SMS-based interactive electronic marketing offer search and distribution system of claim 1, wherein;

the defined number of the identified matched electronic marketing offers is selected based, at least in part, on the limits imposed by SMS communication channels and SMS communication protocols.

8. The computing system implemented process for providing an SMS-based interactive electronic marketing offer search and distribution system of claim 1, wherein;
the one or more keywords are selected and/or inferred the content, and/or context, of the original SMS text message and the initial search parameters.

9. The computing system implemented process for providing an SMS-based interactive electronic marketing offer search and distribution system of claim 4, wherein;
at least one of the one or more keywords are selected from the key features associated with the electronic marketing data.

10. The computing system implemented process for providing an SMS-based interactive electronic marketing offer search and distribution system of claim 1, wherein;
the keywords are highlighted by enclosing the keywords in brackets "[ ]".

11. The computing system implemented process for providing an SMS-based interactive electronic marketing offer search and distribution system of claim 1, wherein;
the additional keywords are selected and/or inferred the content, and/or context, of the original SMS text message, the initial search parameters, and/or the matched electronic marketing offers, and/or the keyword matched electronic marketing offers.

12. A system for providing an SMS-based interactive electronic marketing offer search and distribution system comprising:
a user mobile system;
an electronic marketing offer computing system;
an SMS communication link between the user mobile system and the electronic marketing offer computing system; and
at least one processor associated with at least one computing system, the at least one processor executing instructions associated with a process for providing an SMS-based interactive electronic marketing offer search and distribution system, the process for providing an SMS-based interactive electronic marketing offer search and distribution system comprising:
obtaining electronic marketing data representing one or more electronic marketing offers;
the electronic marketing offer computing system receiving an original SMS text message from a user via the SMS communication link, the original SMS text message including at least one initial search parameter;
searching the electronic marketing data for one or more matched electronic marketing offers that match, or most closely match, the at least one initial search parameter;
identifying one or more matched electronic marketing offers that match, or most closely match, the at least one initial search parameter in the electronic marketing data;
selecting a defined number of the identified matched electronic marketing offers to be sent to the user;
analyzing the selected matched electronic marketing offers and the electronic marketing data to identify one or more keywords in the selected matched electronic marketing offers, the keywords being associated with additional electronic marketing offers and/or information;
identifying one or more keywords in the selected matched electronic marketing offers;
generating an SMS search response message that includes SMS text representing the matched electronic marketing offers and at least one keyword of the one or more identified keywords with the at least one keyword being highlighted by one or more highlighting methods to distinguish the at least one keyword from the other SMS text;
sending the SMS search response message to the user via the SMS communications link;
the electronic marketing offer computing system receiving a follow-up SMS text message from the user via the SMS communications link, the follow-up SMS text message including a user selected keyword from the SMS search response message;
interpreting the user selected keyword in light of the content, and context, of the matched electronic marketing offers and the initial search parameters and then use the user selected keyword and the initial search parameters to perform an additional search of the electronic marketing data for one or more keyword matched electronic marketing offers that match, or most closely match, the at least one initial search parameter and include the user selected keyword;
identifying one or more keyword matched electronic marketing offers that match, or most closely match, the at least one initial search parameter in the electronic marketing data and include the user selected keyword;
selecting a defined number of the identified keyword matched electronic marketing offers to be sent to the user;
analyzing the selected keyword matched electronic marketing offers and the electronic marketing data to identify additional keywords in the selected keyword matched electronic marketing offers, the additional keywords being associated with additional electronic marketing offers and/or information;
generating an SMS keyword search response message that includes SMS text representing the matched electronic marketing offers and, if additional keywords were identified, at least one additional keyword of the identified additional keywords, with any additional keywords being highlighted by one or more highlighting methods to distinguish the additional keywords from the other SMS text;
sending the SMS keyword search response message to the user via the SMS communications link; and
for each new follow-up SMS text message from the user, using the at least one processor associated with at least one computing system to repeat the process from receiving a follow-up SMS text message from the user via the SMS communications link on until the user accepts an identified keyword matched electronic marketing offer and/or the user fails to respond with a follow-up SMS text message.

13. The system for providing an SMS-based interactive electronic marketing offer search and distribution system of claim 12, wherein;
at least part of the electronic marketing data representing one or more electronic marketing offers is obtained from one or businesses.

14. The system for providing an SMS-based interactive electronic marketing offer search and distribution system of claim 12, wherein;
at least part of the electronic marketing data representing one or more electronic marketing offers is in the form of Extensible Markup Language (XML).

15. The system for providing an SMS-based interactive electronic marketing offer search and distribution system of claim 12, wherein;
at least part of the electronic marketing data is analyzed to identify one or more key features associated with the electronic marketing data and the one or more key features are used to correlate and categorize the one or more electronic marketing offers represented by the electronic marketing data.

16. The system for providing an SMS-based interactive electronic marketing offer search and distribution system of claim 15, wherein;
at least one of the key features associated with the electronic marketing data is selected from the group of key features consisting of:
the type of item being offered;
a brand name or model name/number associated with the item;
dimensions or features associated with the item;
one or more stores associated with the item or the electronic marketing offer;
a location associated with the item or the electronic marketing offer;
landmarks near the location associated with the item or the electronic marketing offer;
a retail or Manufacturer's Suggested Retail Price (MSRP) for the item; and
the terms of the electronic marketing offer.

17. The system for providing an SMS-based interactive electronic marketing offer search and distribution system of claim 12, wherein;
the at least one initial search parameter includes the name of the item of interest and the location of the user.

18. The system for providing an SMS-based interactive electronic marketing offer search and distribution system of claim 12, wherein;
the defined number of the identified matched electronic marketing offers is selected based, at least in part, on the limits imposed by SMS communication channels and SMS communication protocols.

19. The system for providing an SMS-based interactive electronic marketing offer search and distribution system of claim 12, wherein;
the one or more keywords are selected and/or inferred the content, and/or context, of the original SMS text message and the initial search parameters.

20. The system for providing an SMS-based interactive electronic marketing offer search and distribution system of claim 15, wherein;
at least one of the one or more keywords are selected from the key features associated with the electronic marketing data.

21. The system for providing an SMS-based interactive electronic marketing offer search and distribution system of claim 12, wherein;
the keywords are highlighted by enclosing the keywords in brackets "[ ]".

22. The system for providing an SMS-based interactive electronic marketing offer search and distribution system of claim 12, wherein;
the additional keywords are selected and/or inferred the content, and/or context, of the original SMS text message, the initial search parameters, and/or the matched electronic marketing offers, and/or the keyword matched electronic marketing offers.

* * * * *